(12) United States Patent
Sakamoto et al.

(10) Patent No.: US 11,573,749 B2
(45) Date of Patent: Feb. 7, 2023

(54) IMAGE FORMING APPARATUS AND METHOD FOR CONTROLLING IMAGE FORMING APPARATUS

(71) Applicants: Takuya Sakamoto, Kanagawa (JP); Hideaki Suzuki, Kanagawa (JP)

(72) Inventors: Takuya Sakamoto, Kanagawa (JP); Hideaki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/467,355

(22) Filed: Sep. 6, 2021

(65) Prior Publication Data

US 2022/0091797 A1 Mar. 24, 2022

(30) Foreign Application Priority Data

Sep. 24, 2020 (JP) .............................. JP2020-159262

(51) Int. Cl.
*G06F 3/12* (2006.01)
*G06K 15/02* (2006.01)

(52) U.S. Cl.
CPC .......... *G06F 3/1208* (2013.01); *G06F 3/1252* (2013.01); *G06F 3/1282* (2013.01); *G06K 15/027* (2013.01)

(58) Field of Classification Search
None
See application file for complete search history.

(56) References Cited

U.S. PATENT DOCUMENTS

| 8,042,901 B2 | 10/2011 | Mihara |
| 10,579,006 B2 | 3/2020 | Kobayashi et al. |
| 2006/0132871 A1* | 6/2006 | Beretta ............... H04N 1/62 358/518 |
| 2009/0015606 A1* | 1/2009 | Mihara ............... B41J 29/393 347/5 |
| 2012/0194599 A1* | 8/2012 | Kido ............... B41J 11/0065 347/19 |
| 2014/0022568 A1* | 1/2014 | Nakaya ............... B41J 11/008 358/1.6 |
| 2017/0109856 A1* | 4/2017 | Inazumi ............... G06T 7/74 |
| 2017/0331984 A1* | 11/2017 | Akagi ............... H04N 1/4097 |

(Continued)

FOREIGN PATENT DOCUMENTS

| JP | H0695474 | * | 4/1994 | ............ G03G 15/00 |
| JP | H089147 | * | 1/1996 | ............ H04N 1/40 |

(Continued)

*Primary Examiner* — Beniyam Menberu
(74) *Attorney, Agent, or Firm* — Duft & Bornsen, PC

(57) ABSTRACT

An image forming apparatus includes one or more processors and one or more memories storing program instructions, which, when being executed by the one or more processors, causes the one or more processors to generate a print image to be printed on a sheet of paper and a position correcting mark for front and back side registration having a brightness lower than a minimum brightness of the print image; control printing of the print image and the position correcting mark on a first side of the sheet of paper; control reading the print image and the position correcting mark from the first side and control generating of read image data; and detect, from the read image data, the position correcting mark on the first side using a brightness difference.

11 Claims, 13 Drawing Sheets

(56) References Cited

U.S. PATENT DOCUMENTS

2020/0086659 A1\* 3/2020 Takahashi .............. B41J 11/008
2021/0397912 A1\* 12/2021 Ching ................ G06K 15/1822

FOREIGN PATENT DOCUMENTS

| JP | 2006338584 | \* | 12/2006 | ............... G06T 1/00 |
| --- | --- | --- | --- | --- |
| JP | 2008-219210 | | 9/2008 | |
| JP | 2008-271473 | | 11/2008 | |
| JP | 4595969 | | 12/2010 | |
| JP | 2015206843 | \* | 11/2015 | ............ G03G 15/00 |
| JP | 2016090961 | \* | 5/2016 | ............ G03G 15/00 |
| JP | 2016157044 | \* | 9/2016 | ............ G03G 15/01 |
| JP | 2016180857 | \* | 10/2016 | ............ H04N 1/387 |
| JP | 2019-098734 | | 6/2019 | |

\* cited by examiner

IMAGE FORMING APPARATUS AND METHOD FOR CONTROLLING IMAGE FORMING APPARATUS

CROSS-REFERENCE TO RELATED APPLICATIONS

The present application is based on and claims priority under 35 U.S.C. § 119 to Japanese Patent Application No. 2020-159262, filed Sep. 24, 2020. The contents of Japanese Patent Application No. 2020-159262 are incorporated herein by reference in their entirety.

BACKGROUND OF THE INVENTION

1. Field of the Invention

The present invention relates to an image forming apparatus and a method for controlling an image forming apparatus.

2. Description of the Related Art

A method for printing position detecting marks such as register marks in an image forming apparatus is known. The position detecting marks serve as indications of cutting positions at a time of cutting a sheet of paper on which an image is printed; and are printed at edges or four corners of the sheet of paper outside a printing area. A method for detecting position correcting marks that are used for front and back side registration printed on a sheet of paper together with an image to be printed is known. Then, an image is printed also on a back side of the sheet of paper in accordance with a position of the image printed on the sheet or paper (see, for example, Japanese Unexamined Patent Application Publication No. 2008-271473 and Japanese Unexamined Patent Application Publication No. 2019-98734).

SUMMARY OF THE INVENTION

An image forming apparatus according to the present invention includes one or more processors and one or more memories storing program instructions, which, when being executed by the one or more processors, causes the one or more processors to generate a print image to be printed on a sheet of paper and a position correcting mark for front and back side registration having a brightness lower than a minimum brightness of the print image; control printing of the print image and the position correcting mark on a first side of the sheet of paper; control reading the print image and the position correcting mark from the first side and control generating of read image data; and detect, from the read image data, the position correcting mark on the first side using a brightness difference.

Other objects, features, and advantages of the present invention will become more apparent from the following detailed description when read in conjunction with the accompanying drawings.

DESCRIPTION OF THE EMBODIMENTS

Figure 1:
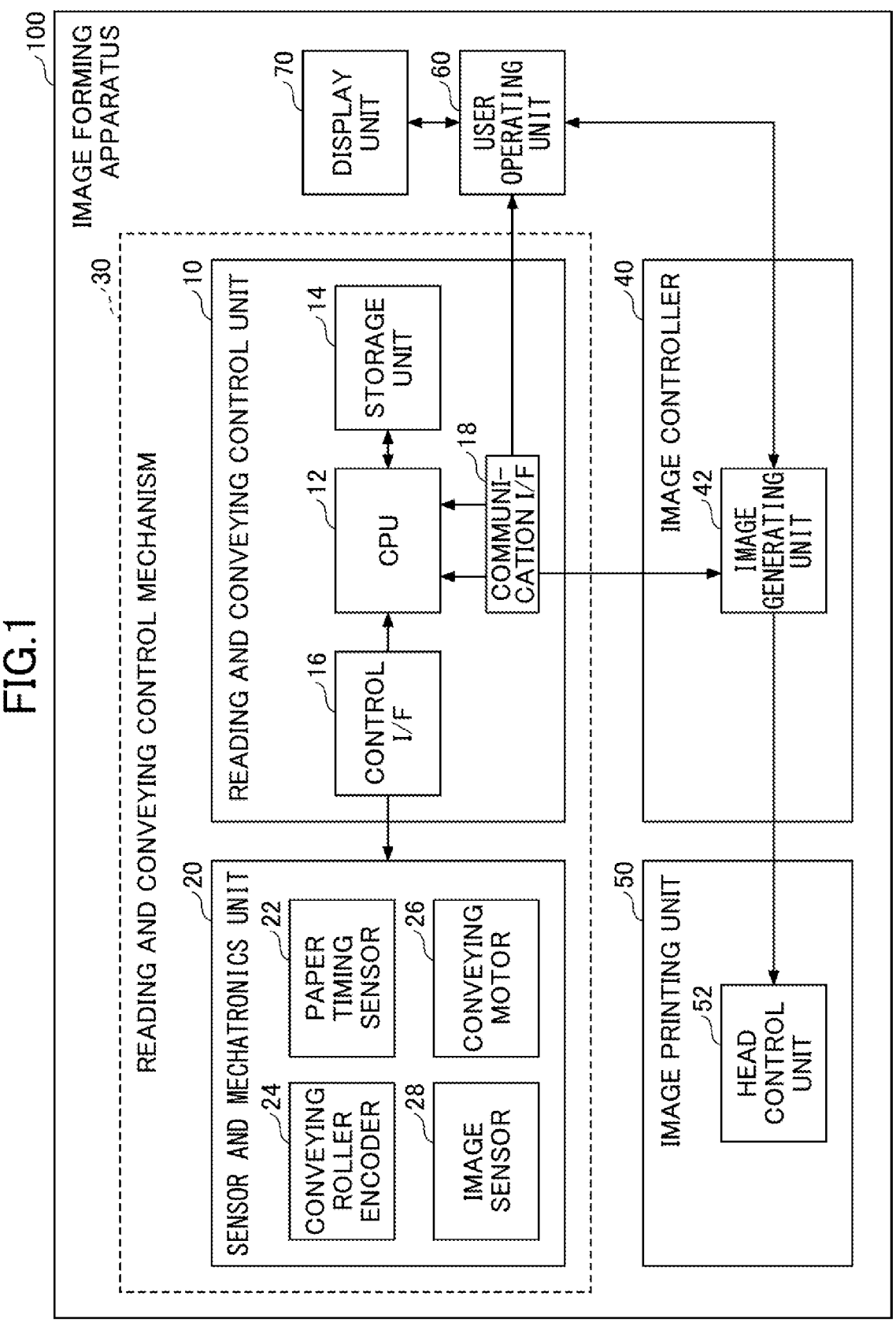
FIG. 1 is a block diagram depicting an example of an image forming apparatus according to a first embodiment.

In a print image to be printed mentioned above, when pixels with the same brightness as the brightness of a position correcting mark are found on a peripheral portion close to the position correcting mark, there is a risk that the position correcting mark cannot be distinguished and thus the position correcting mark cannot be detected. In particular, in a case of multiple page layout printing where multiple pages of images are collectively printed on one sheet of paper, a position correcting mark which is printed at an intermediate position on the sheet paper is printed between mutually adjacent print images, and thus, is difficult to detect.

The disclosed technique has been developed in view of such a situation and is intended to surely detect each of a plurality of position correcting marks printed together with print images to be printed.

An image forming apparatus according to the present invention includes one or more processors and one or more memories storing program instructions to cause the one or more processors to generate a print image to be printed on a sheet of paper and generate a position correcting mark for front and back side registration having a brightness lower than the minimum brightness of the print image; control printing of the print image and the position correcting mark on a first side of the sheet of paper; control reading, through a reader, the print image and the position correcting mark from the first side and generate read image data; and detect, from the read image data, the position correcting mark on the first side using a brightness difference.

As a result, each of a plurality of position correcting marks printed together with print images to be printed can be surely detected.

Hereinafter, embodiments will be described with reference to the drawings. In each drawing, the same elements are indicated by the same reference numerals and overlapping descriptions may be omitted. In the following, a symbol representing a signal is also used as a symbol representing a corresponding signal line.

First Embodiment

FIG. 1 is a block diagram depicting an example of an image forming apparatus according to a first embodiment. The image forming apparatus 100 depicted in FIG. 1 includes a reading and conveying control mechanism 30 including a reading and conveying control unit 10, a sensor and mechatronics unit 20, an image controller 40, an image printing unit 50, a user operating unit 60, and a display unit 70. The image controller 40 includes an image generating unit 42. The image printing unit 50 includes a head control unit 52.

For example, the image forming apparatus 100 is an ink jet type printer, but is not particularly limited to the ink jet type printer. The image forming apparatus 100 may be a multifunction printer (MFP) having a copying function, a facsimile function, a printing function, a scanner function, and so forth. The image forming apparatus 100 may be one of variable printers having a double-sided printing function.

The reading and conveying control mechanism 30 has a function of conveying a sheet of paper having a print image and register marks for front and back side registration printed on a front side (first side) in the image forming apparatus 100, and detecting positions of the register marks from the sheet of paper. The register marks are an example of position correcting marks for correcting an image of a page printed on a back side (second side) of a sheet of paper in accordance with an image printed on a front side of the sheet of paper. A register mark can be used for at least adjusting a position of, changing a size increase rate of, rotating, or changing a shape of an image printed on a back side of a sheet of paper. Changing a size increase rate causes the image to zoom in or zoom out.

The reading and conveying control unit 10 includes a central processing unit (CPU) 12, a storage unit 14, a control interface (I/F) 16, and a communication interface (I/F) 18. The sensor and mechatronics unit 20 includes a paper timing sensor 22, a conveying roller encoder 24, a conveying motor 26, and an image sensor 28. The image sensor 28 is an example of a reading unit that reads a printed print image and position correcting marks to generate read image data.

For example, the CPU 12 controls the sensor and mechatronics unit 20 in order to detect positions of register mark by executing a control program of the image forming apparatus 100. The CPU 12 may obtain layout information received by the image controller 40 via the user operating unit 60. The layout information indicates the number of pages and a layout of the pages to be collectively arranged onto one sheet of paper. As will be described later, the CPU 12 may calculate position information of register marks on a sheet of paper without using the layout information.

The storage unit 14 stores work data or the like used by the CPU 12. The storage unit 14 stores image data obtained from the sensor and mechatronics unit 20 by the CPU 12 through the control I/F 16. The storage unit 14 may store the layout information received by the image controller 40. The storage unit 14 may store setting information obtained by the CPU 12 from the user operating unit 60 through the communication I/F 18.

For example, the storage unit 14 may store a control program executed by the CPU 12. The control program executed by the CPU 12 may be stored in a built-in read-only memory (ROM) of the CPU 12. The storage unit 14 may include a ROM and a random access memory (RAM) and may include a flash memory.

The control I/F 16 outputs control instructions from the CPU 12 to the sensor and mechatronics unit 20 and outputs image information received from the sensor and mechatronics unit 20 to the CPU 12. The control instructions from the CPU 12 include operation instructions for the conveying motor 26 and operation instructions for the image sensor 28. A response from the sensor and mechatronics unit 20 includes image data on a front side of a sheet of paper read by the image sensor 28. Functions of the paper timing sensor 22, the conveying roller encoder 24, the conveying motor 26, and the image sensor 28 will be described with reference to FIG. 3.

The communication I/F 18 controls communication between the CPU 12 and the image generating unit 42 and communication between the CPU 12 and the user operating unit 60. For example, the communication I/F 18 transmits data indicating a position of a register mark detected by the CPU 12 based on image data received from the image sensor 28 to the image generating unit 42 in the image controller 40. The communication I/F 18 outputs setting information for an image reading function of the sensor and mechatronics unit 20 received from the user operating unit 60 to the CPU 12.

The image generating unit 42 generates image data including a print image to be printed on a front side of a sheet of paper and register marks for front and back side registration of a brightness lower than the minimum brightness of the print image. The image generating unit 42 generates image data including a print image to be printed on a back side of the sheet of paper. The image printing unit 50 receives the image data generated by the image generating unit 42 and controls the head control unit 52 to print an image on the front side or the back side of the sheet of paper.

The image generating unit 42 performs at least adjusting a position of, changing a size increase rate of, rotating, or changes a size of an image to be printed on a back side of a sheet of paper based on a position of a register mark detected by the CPU 12, and generates image data to be printed on the back side of the sheet of paper. When a plurality of pages are collectively arranged onto each of a front side and a back side of a sheet of paper, and corresponding print images are printed on a per page basis, the image generating unit 42 performs an adjustment such as changing shapes of print images of respective pages to be collectively printed on a back side of the sheet of paper based on detected positions of register marks corresponding to the respective pages. Accordingly, the print images can be printed on the back side of the sheet of paper in accordance with the print images printed on the front side of the sheet of paper.

The user operating unit 60 includes, for example, an input device that accepts a user operation such as a touch panel. For example, the user operating unit 60 receives layout information including the number of pages to be collectively arranged onto one sheet of paper and a layout of the pages, and receives setting information to enable or disable a register mark detecting function. The user operating unit 60 receives various instructions, such as printing start instructions, the number of prints, a size increase or decrease rate, color/monochrome, and the like, for operating the image forming apparatus 100.

The display unit 70 displays the operation contents based on a user's operation of the user operating unit 60. The user operating unit 60 may be integrated with the display unit 70 on a display screen of the display unit 70.

Figure 2:
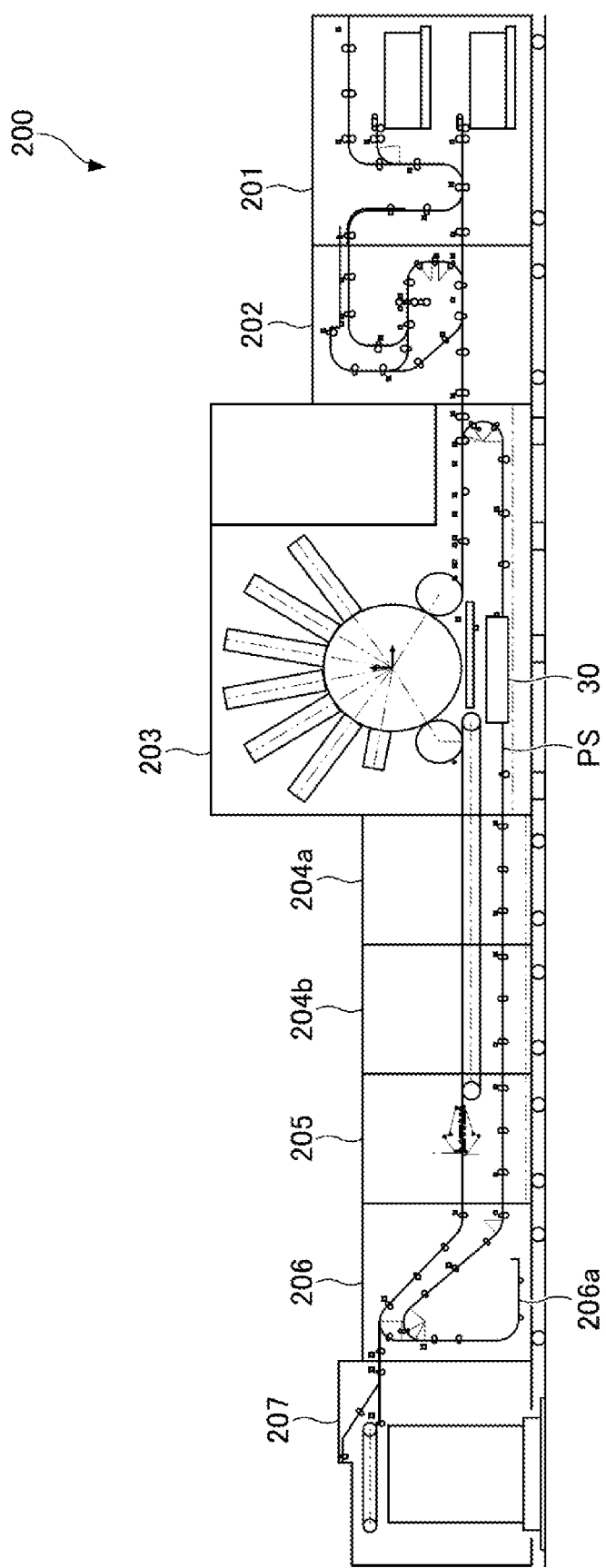
FIG. 2 is a block diagram depicting an example of an image forming apparatus system in which the image forming apparatus depicted in FIG. 1 is mounted.

FIG. 2 is a block diagram depicting an example of an image forming apparatus system 200 in which the image forming apparatus 100 of FIG. 1 is mounted. The image forming apparatus system 200 includes a paper feeding unit 201, a pre-coating unit 202, a main body unit 203, drying units 204*a* and 204*b*, a cooling and smoothing unit 205, an inverting unit 206, and a paper ejecting unit 207.

The paper feeding unit 201 sequentially conveys sheets of paper, which are printing media, to the pre-coating unit 202. The pre-coating unit 202 applies a pre-coating solution to fix ink to the sheet of paper on both sides or one side of the sheet of paper fed from the paper feeding unit 201. The pre-coating unit 202 conveys the sheet of paper coated with the pre-coating solution to the main body unit 203. The pre-coating unit 202 pre-coats the sheet of paper with the pre-coating solution in advance, thereby making it easier to fix ink on the sheet of paper on which the ink is previously hard to fix is fixed. The pre-coating unit 202 may dry the sheet of paper on which the pre-coating solution is applied, using a heater.

The body unit 203, for example, prints an image on a sheet of paper in an ink-jet manner, and conveys the printed sheet of paper to the drying unit 204*a*. The main body unit 203 includes the reading and conveying control mechanism 30 depicted in FIG. 1. The reading and conveying control mechanism 30 is provided on a double-sided conveying path PS along which a sheet of paper on which an image is printed only on a front side of the sheet of paper is conveyed. The reading and conveying control mechanism 30 determines a position of an image printed on a front side of a sheet of paper by detecting a register mark in a double-sided printing mode. The reading and conveying control mechanism 30 outputs image correction information for printing an image on a back side of the sheet of paper in accordance with the image printed on the front side of the sheet of paper based on the determination result to the image generating unit 42 (see FIG. 1).

The drying units 204*a* and 204*b* dry ink on a sheet of paper on which printing has been performed by the body unit 203 and fix the ink to the sheet of paper. The cooling and smoothing unit 205 cools a sheet of paper that has become hot by drying, smooths wrinkles of the cooled sheet of paper resulting from being dried, and conveys the sheet of paper to the inverting unit 206.

The inverting unit 206 conveys the conveyed sheet of paper to the paper ejecting unit 207 when the sheet of paper for which printing has been performed on one side is conveyed or when the sheet of paper for which printing has been performed on both sides is conveyed. The inverting unit 206 conveys the conveyed sheet of paper to the main body unit 203 by a switchback mechanism when the sheet of paper for which printing has been performed on one side is conveyed during double-sided printing of the sheet of paper.

The switchback mechanism is a mechanism in which a sheet of paper is once withdrawn to a paper withdrawing unit 206*a* by a forward-rotating reverse roller, and then the sheet of paper is fed toward the main body unit 203 by the reverse-rotating reverse roller, so that the sheet of paper for which printing has been performed on one side is inverted upside down and is conveyed to the main body unit 203. The paper ejecting unit 207 ejects the sheet of paper that has been conveyed from the inverting unit 206 to a stack unit.

Figure 3:
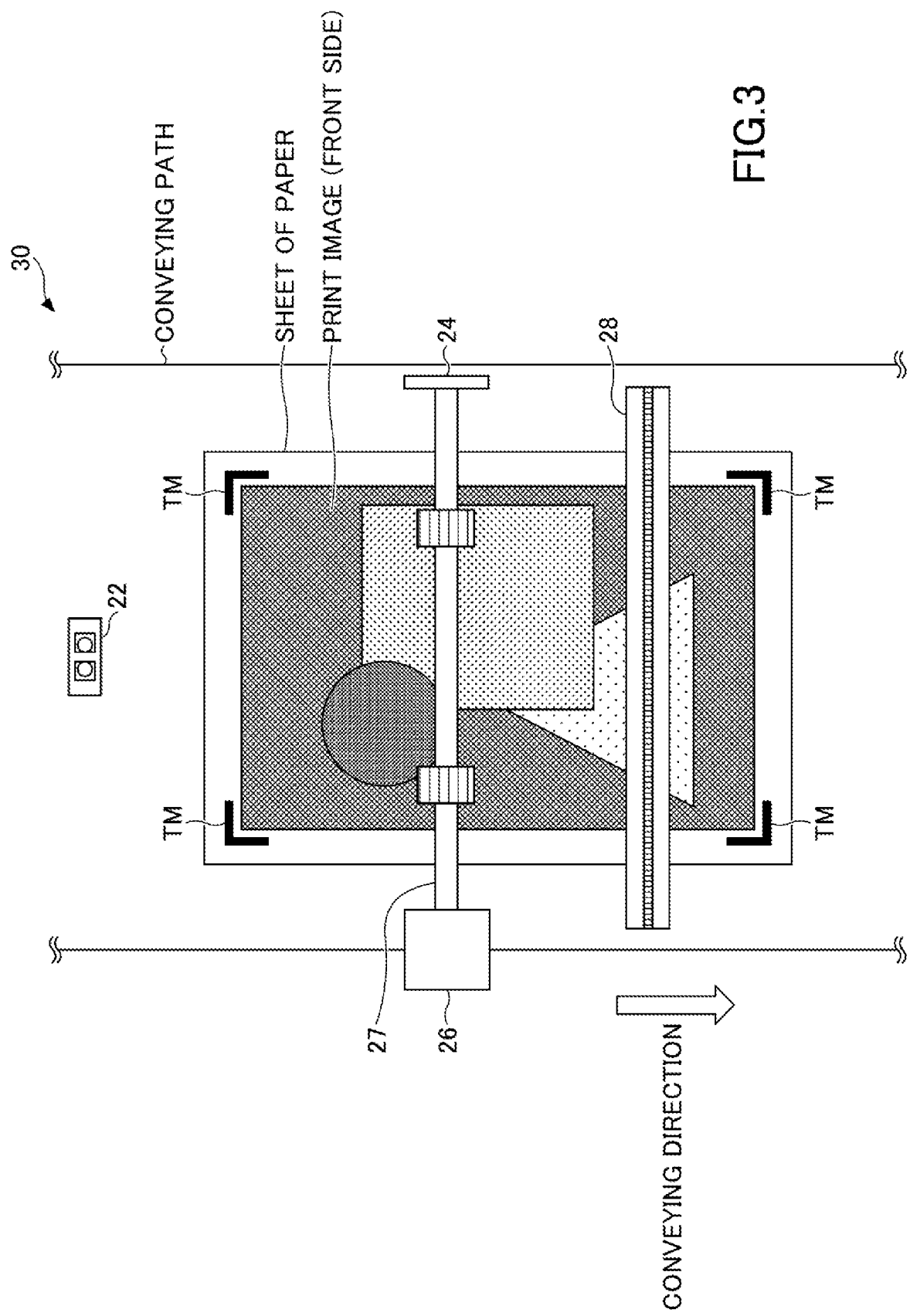
FIG. 3 is a diagram depicting an outline of operations of detecting a position of a register mark using a reading and conveying control mechanism.

FIG. 3 is an explanatory diagram depicting an outline of operations of detecting a position of a register mark by the reading and conveying control mechanism 30 of FIG. 1. The paper timing sensor 22, the conveying roller encoder 24, the conveying motor 26, and the image sensor 28 are installed in the body unit 203 of FIG. 2.

The paper timing sensor 22 is installed at an upstream side (a drying unit 204*a* side in FIG. 2) of a conveyance path (a double-sided printing conveyance pass PS in FIG. 2) in the conveyance direction of a sheet of paper. The image sensor 28 is positioned downstream in the conveyance direction of the conveyance path. The conveying motor 26, the conveying roller 27, and the conveying roller encoder 24 are disposed between the paper timing sensor 22 and the image sensor 28. The conveying motor 26 and the conveying roller 27 are examples of a conveying unit that conveys a sheet of paper to the image sensor 28. The conveying direction (a vertical direction in FIG. 3) is an example of a first direction, and an extending direction (a horizontal direction in FIG. 3) of the image sensor 28 is an example of a second direction perpendicular to the first direction.

The paper timing sensor 22 detects that a sheet of paper on which reading is performed by the image sensor 28 has passed. The conveying motor 26 is provided at one end of the conveying roller 27, and rotates the conveying roller 27 in order to move a sheet of paper in the conveying direction. The conveying roller 27 includes a feeding member of an elastic body for feeding a sheet of paper on a conveying passage in the conveying direction. The conveying roller encoder 24 is disposed at the other end of the conveying roller 27 and detects a rotation amount of the conveying roller 27.

The image sensor 28 is of a contact type and, in contact with a front side of a sheet paper conveyed, reads an image printed on the front side of the sheet of paper, based on instructions from the CPU 12 to generate read image data. At this time, the image sensor 28 reads register marks TM printed around a print image as well as the print image printed on the front side of the sheet of paper. For example, but not particularly limited, the register marks TM are L-shaped. The image sensor 28 outputs the generated read image data (including image data of the register marks TM) to the CPU 12. An image sensor using a reduction optical system may be used instead of the contact-type image sensor 28.

When reading a print image and a register mark TM on a front side of a sheet of paper, the CPU 12 first controls a timing to start reading images (a print image and a register mark TM) by the image sensor 28 based on a detection of passing of the sheet of paper by the paper timing sensor 22. The image sensor 28 performs an image reading operation on the print image on the front side of a sheet of paper that is conveyed through the conveying path based on instructions from the CPU 12.

The CPU 12 detects the register mark TM printed on the sheet of paper from image data received from the image sensor 28. The CPU 12 then calculates a position of each of register marks TM based on the read position of the sheet of paper by the image sensors 28. The CPU 12 is an example of a mark detecting unit that detects a register mark TM on a front side of a sheet of paper using a brightness difference from image data generated by the image sensor 28.

For example, when determining the read position of the sheet of paper, the CPU 12 calculates the conveyance distance of the sheet of paper according to the detecting time of the sheet of paper by the paper timing sensor 22, the rotation distance detected by the conveying roller encoder 24, the line scanning cycle of the image sensor 28, and the number of read lines. The CPU 12 converts the calculated conveyance distance of the sheet of paper to the read position of the sheet of paper. When there is a driven roller opposite to the conveying roller 27 with respect to a sheet of paper, the conveying roller encoder 24 may be provided at the driven roller.

The image sensor 28 sequentially generates line image data for each line of pixels arranged in a direction perpendicular to the conveying direction on a sheet of paper being conveyed in the conveying direction. Note that line image data is one example of read line image data. The CPU 12 may binarize line image data every time the image sensor 28 generates the line image data and perform a detection process for a register mark TM. Image data binarization and register mark TM detection processes are performed concurrently with reading of the image by the image sensor 28, so that the register mark TM detection process can be performed at a high speed. Further, a memory capacity required in the storage unit 14 or the like to store image data can be minimized.

As the paper conveying method, a claw conveying method in which a front end of a sheet of paper is caught by a claw may be used instead of the conveying method using the conveying roller 27. In addition, as the paper conveying method, a belt conveying method in which a sheet of paper is moved with the sheet of paper being placed on a tensioned belt may be used.

In the belt conveying method, the sheet of paper placed on the belt may be suctioned from the interior of the belt to place the sheet of paper onto the belt. Alternatively, the sheet of paper may be placed onto the belt by blowing air from the top of the belt onto the sheet of paper that is on the belt. Further, a drum conveying method may be used. In the drum conveying method, a sheet of paper is placed on a drum by using a placing mechanism similar to the belt conveying method described above and the sheet of paper is conveyed by the rotating operation of the drum.

Figure 4:
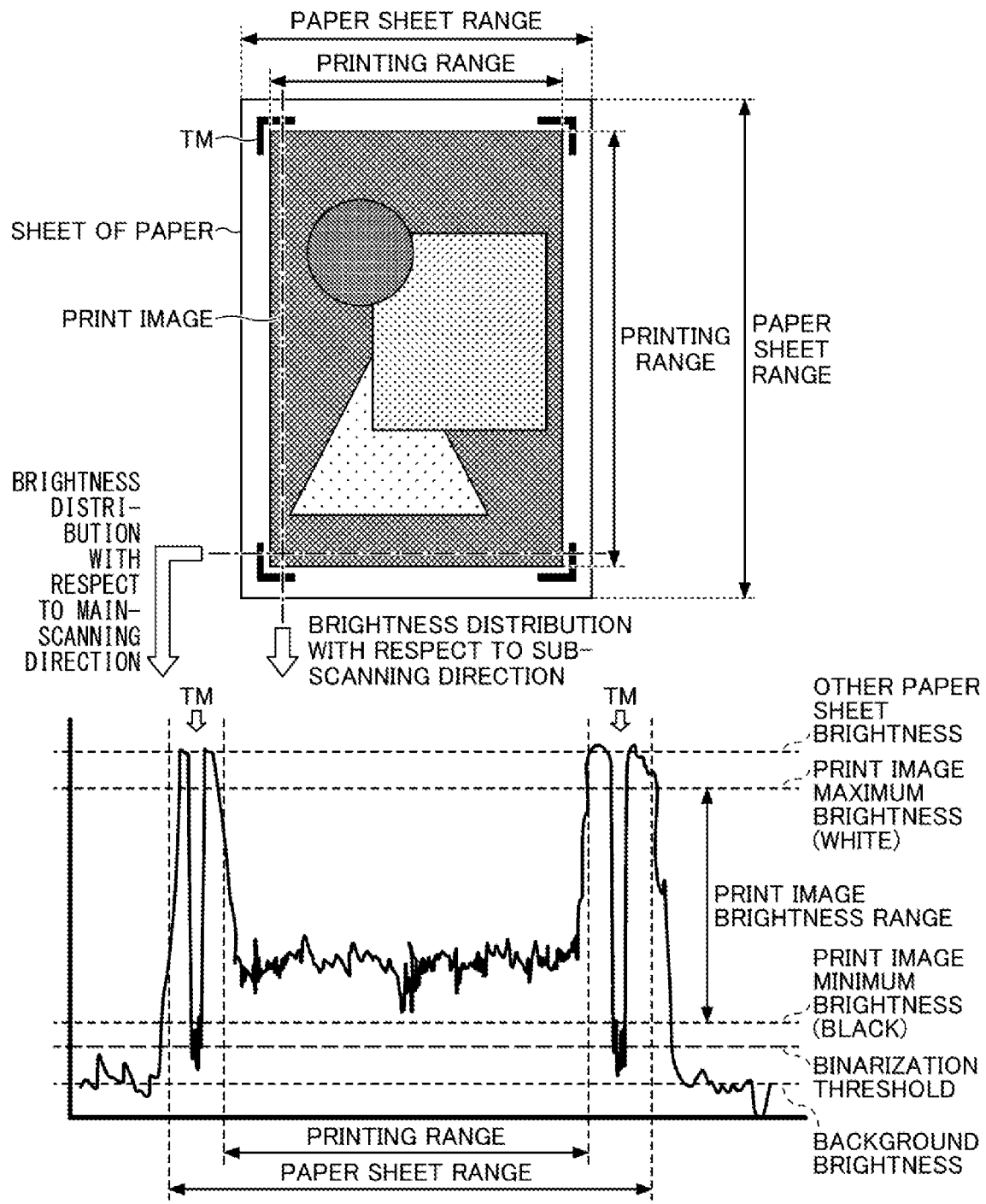
FIG. 4 is a view depicting an example of an image and register marks printed on a front side of a sheet of paper using the image forming apparatus depicted in FIG. 1.

FIG. 4 is an explanatory diagram depicting an example of an image and register marks TM printed on a front side of a sheet of paper by the image forming apparatus 100 of FIG. 1. For example, register marks TM are printed on a sheet of paper, indicated in FIG. 4 as a paper sheet range, at four corners around the print image indicated as a printing range. FIG. 4 depicts an example in which one image is printed on a sheet of paper. However, even when a plurality of pages are collectively printed on one sheet of paper in a multiple page layout manner, register marks TM are printed around a print image of each of the plurality of pages on the sheet of paper.

A brightness of register marks TM is set to be less than the minimum brightness of a brightness range of a print image. That is, register marks TM are printed on a sheet of paper at a density higher (darker) than the darkest density of a print image. A range of printing density between the maximum brightness (e.g., white) and the minimum brightness (e.g., black) of a print image is adjusted through density correction performed at a time of printing. That is, when printing a print image, the image forming apparatus 100 corrects density data of image data taking into account density irregularity due to a variation with respect to head nozzles of the image printing unit 50 or a density decrease due to a defect of a head nozzle.

The reading and conveying control mechanism 30 depicted in FIG. 1 reads a print image and register marks TM printed on a sheet of paper by the image sensor 28 and obtains a brightness distribution for detecting the register marks TM. For example, image data generated by the image sensor 28 undergoes shading correction in such a manner that a brightness range between the other brightness of the sheet of paper ("other paper sheet brightness" in FIG. 4) and the brightness of a background outside the sheet of paper ("background brightness" in FIG. 4) corresponds to a full scale. The reading and conveying control mechanism 30 obtains a brightness distribution with respect to the main-scanning direction that is the extending direction of the image sensor 28 and a brightness distribution with respect to the sub-scanning direction that is the conveying direction of a sheet of paper.

By setting a brightness of a register mark TM lower than the minimum brightness of a print image, even when the brightness of the print image is generally low, the reading and conveying control mechanism 30 can surely detect the register mark TM. In addition, by setting a binarization threshold between the minimum brightness of a print image and a brightness of a register mark TM to be printed, it is possible to extract only the register mark TM based on the brightness distribution data.

Figure 5:
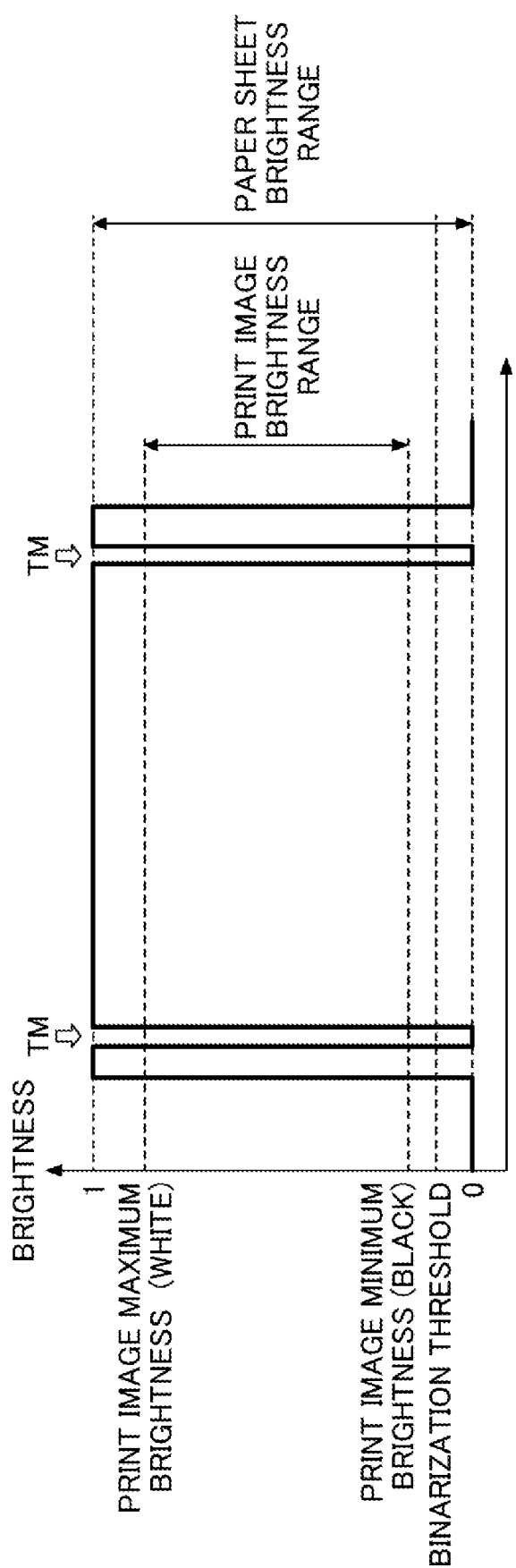
FIG. 5 is a diagram depicting an example in which only the register marks are extracted based on brightness distribution data obtained as depicted in FIG. 4 using a binarization threshold.

FIG. 5 is a diagram depicting an example in which only a register marks TM is extracted based on the brightness distribution data depicted in FIG. 4 using a binarization threshold. Because the binarization threshold is lower than the minimum brightness of the print image, the brightness "1" that indicates white is surely obtained through the binarization as a brightness value of the print image. In addition, because the binarization threshold is higher than brightness values of the register marks TM, the brightness "0" that indicates black is surely obtained through the binarization as brightness values of the register marks TM. Thus, by merely binarizing image data using a binarization threshold, it is possible to extract only register marks TM.

Figure 6:
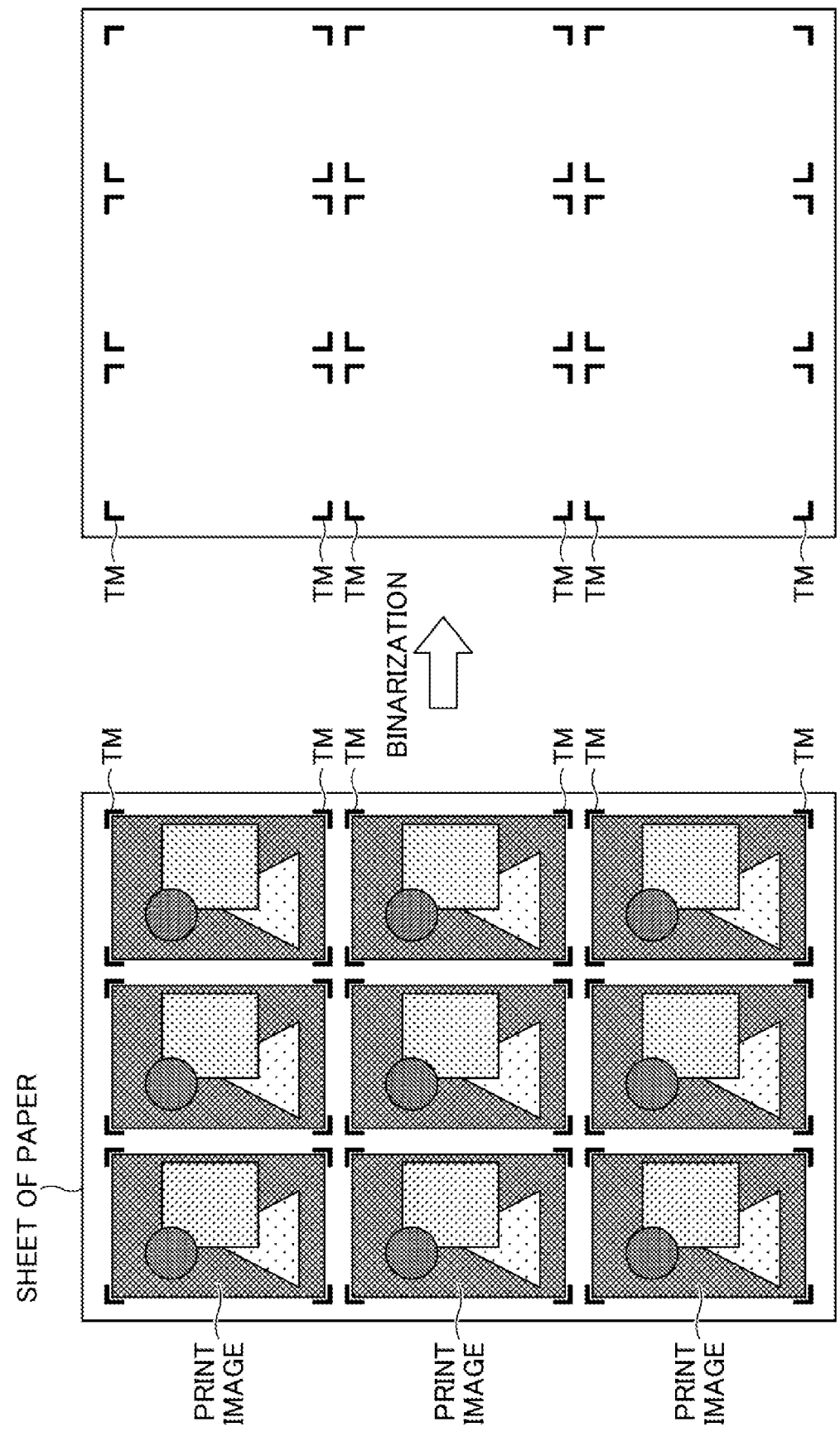
FIG. 6 is a diagram depicting an example of detecting register marks from brightness distribution data using a binarization threshold when multiple images (pages) are collectively arranged on a sheet of paper.

FIG. 6 is an explanatory diagram depicting an example of detecting register marks TM from brightness distribution data using a binarization threshold when a plurality of images (pages) are collectively arranged onto one sheet of paper. FIG. 6 depicts an example in which a total of nine pages, i.e., three pages (horizontally) by three pages (vertically) on one sheet of paper. Register marks TM are printed at four corners of each page.

By printing the register marks TM with a darker color than the print image of each page of FIG. 6, the print images can be clearly distinguished from the register marks TM. The areas of the print images do not include brightness information below the preset minimum brightness value. As a result, through a binarization process using the binarization threshold lower than the minimum brightness value performed on image data obtained from reading the entire side of the sheet of paper, binary image data including only data of the register marks TM printed on the sheet of paper can be obtained.

As described above, by binarizing read image data read from a sheet of paper having a multiple page layout of print images and register marks TM having a brightness lower than the minimum brightness of the print images, it is possible to easily distinguish and detect the register marks TM present at intermediate positions on the sheet of paper from the print images. As a result, the positions of the register marks TM corresponding to each page of the multiple page layout of the print images (pages) can be easily calculated.

Figure 7:
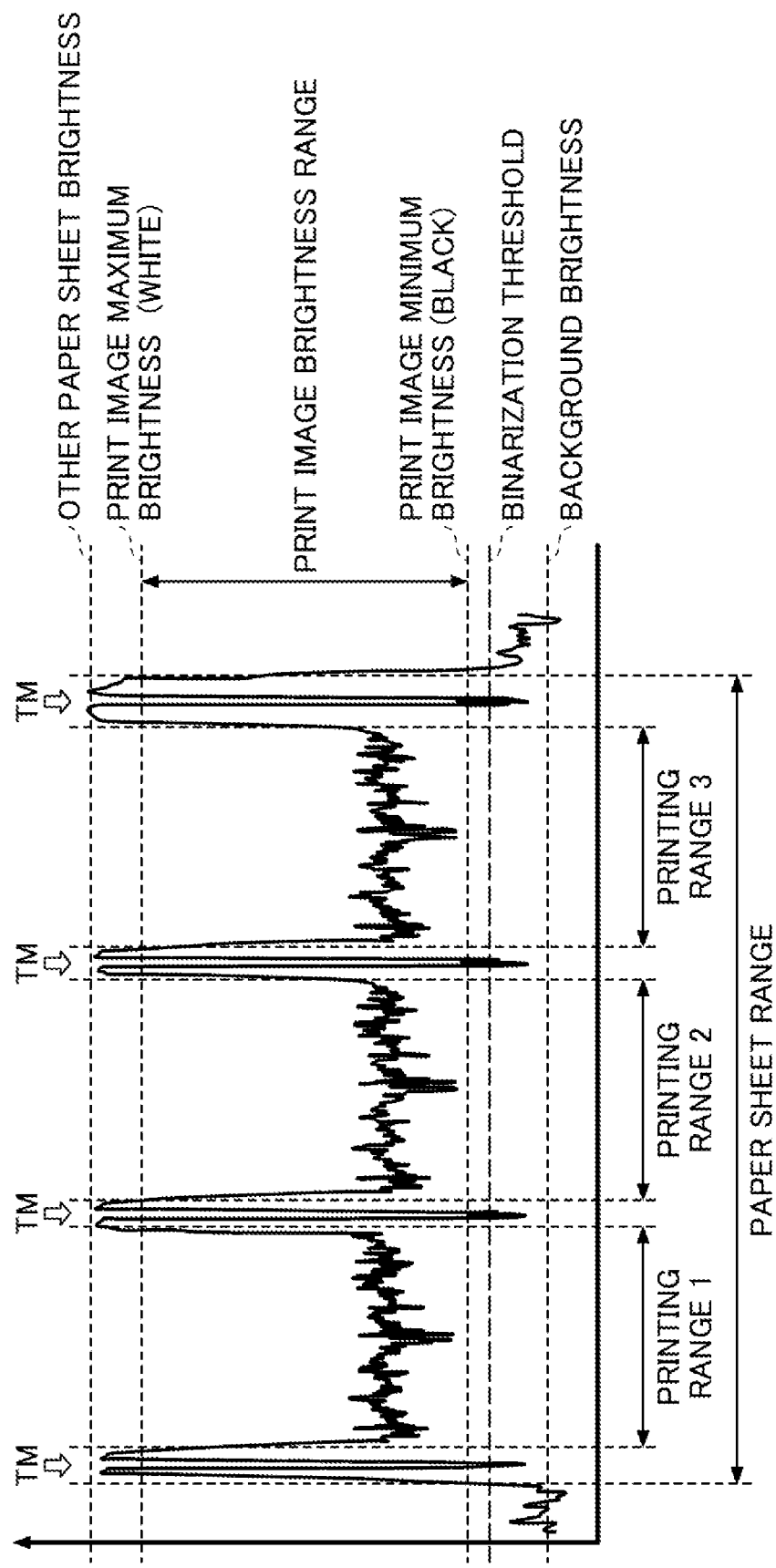
FIG. 7 is a diagram depicting an example of brightness distribution data of a printed sheet of paper on which a plurality of pages are collectively arranged together with register mark having a brightness lower than the minimum brightness.

FIG. 7 is an explanatory diagram depicting an example of brightness distribution data of a sheet of paper on which a plurality of pages collectively arranged in a manner of multiple page layout together with register marks TM having a brightness value lower than the minimum brightness value of the print images are printed. FIG. 7 depicts brightness distribution data of image data obtained from reading areas including the register marks TM with respect to either the main-scanning direction or the sub-scanning direction of the sheet of paper.

In the example depicted in FIG. 7, in particular, the differences of the brightness of the register marks TM present between the printing ranges 1 and 2 of print images and the brightness of the register marks TM present between the printing ranges 2 and 3 of print images, from the minimum brightness of the print images, can be increased. As a result, it is possible to easily detect the register marks TM provided around the print images and located at intermediate positions on the sheet of paper.

Figure 8:
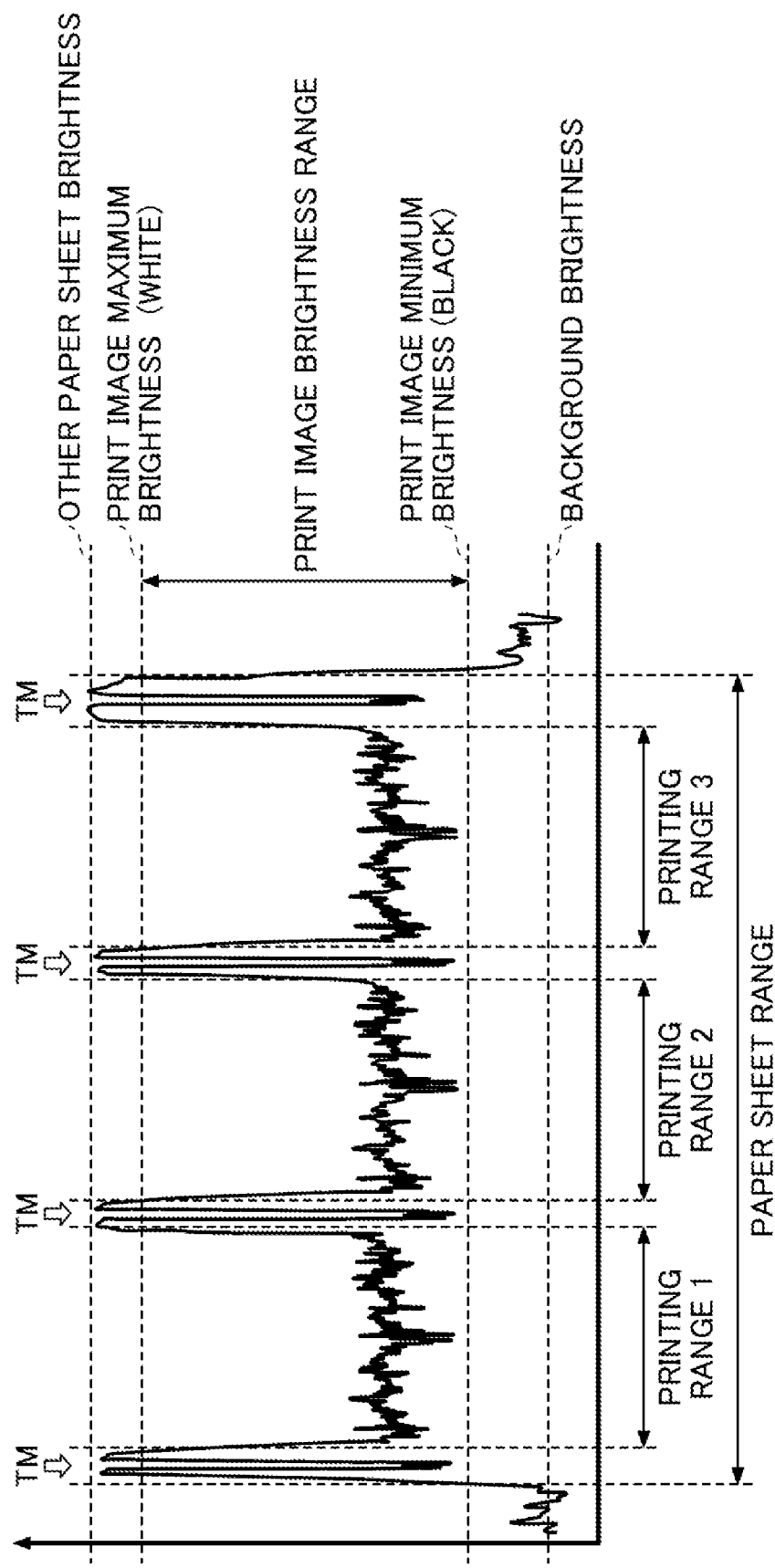
FIG. 8 is an explanatory diagram (comparison example) depicting an example of brightness distribution data of a printed sheet of paper on which a plurality of pages are collectively arranged together with register marks having a brightness higher than the minimum brightness.

FIG. 8 is an explanatory diagram (a comparison example) depicting an example of brightness distribution data of a sheet of paper on which a plurality of pages collectively arranged in a multiple page layout together with register marks TM having a brightness higher than the minimum brightness values of print images are printed. In the example depicted in FIG. 8, in particular, the brightness of the register marks TM present between the printing ranges 1 and 2 of the print images and the brightness of the register marks TM present between the printing ranges 2 and 3 of the print images may not be less than the minimum brightness of the print images. In this case, the accuracy of detection of the register marks TM is reduced.

In order to deal with the situation where the detection accuracy of the register marks TM is reduced, it may be considered that a reading process is to be performed by masking areas other than areas where the register marks TM may exist based on page layout information with respect to the sheet of paper. However, as depicted in FIG. 8, when the print images include images having a brightness equivalent to a brightness of register marks TM, even when a reading range is limited by masking, detection of the register marks TM may be difficult.

Further, by widening areas to be masked and narrowing reading ranges, it may be possible to read areas that include smaller ranges of print images as possible. However, in this case, areas not including register marks TM may be read due to an influence of a sheet of paper skew at a time of reading or a misalignment of a sheet of paper. That is, when a plurality of pages are collectively arranged onto one sheet of paper and register marks TM having a brightness higher than the minimum brightness values of the print images are printed together with the print images, it is difficult to accurately detect the register marks TM in a method in which a reading range is narrowed by masking in a reading process.

As described above, in the present embodiment, by printing a register mark TM for front and back side registration of a brightness value lower than the minimum brightness value of a print image on a front side of a sheet of paper, the register mark TM can be easily detected, and the position of the register mark TM can be easily calculated. That is, each of a plurality of register marks TM printed together with a print image(s) can be surely detected. As a result, it is possible to accurately adjust a position of or change a shape of an image to be printed on a back side of the sheet of paper in accordance with the image printed on the front side of the sheet of paper.

By binarizing image data using a binarization threshold set between the minimum brightness value of a print image and a brightness value of a register mark TM, only the register mark TM can be extracted based on the binary image data (brightness distribution data).

Binarization of image data and detection of a register mark TM are performed concurrently with reading of an image by the image sensor 28, so that the detection process with respect to the register mark TM can be performed at a high speed. Further, a memory capacity used in the storage unit 14 or the like to store image data can be minimized.

Even when multiple pages are collectively arranged on one sheet of paper, register marks TM that exist at intermediate positions on the sheet of paper can be easily distinguished from the print images and detected, by printing the register marks TM having a brightness value lower than the minimum brightness value of the print images. As a result, the positions of the register marks TM corresponding to each of the arranged pages can be easily calculated.

Second Embodiment

Figure 9:
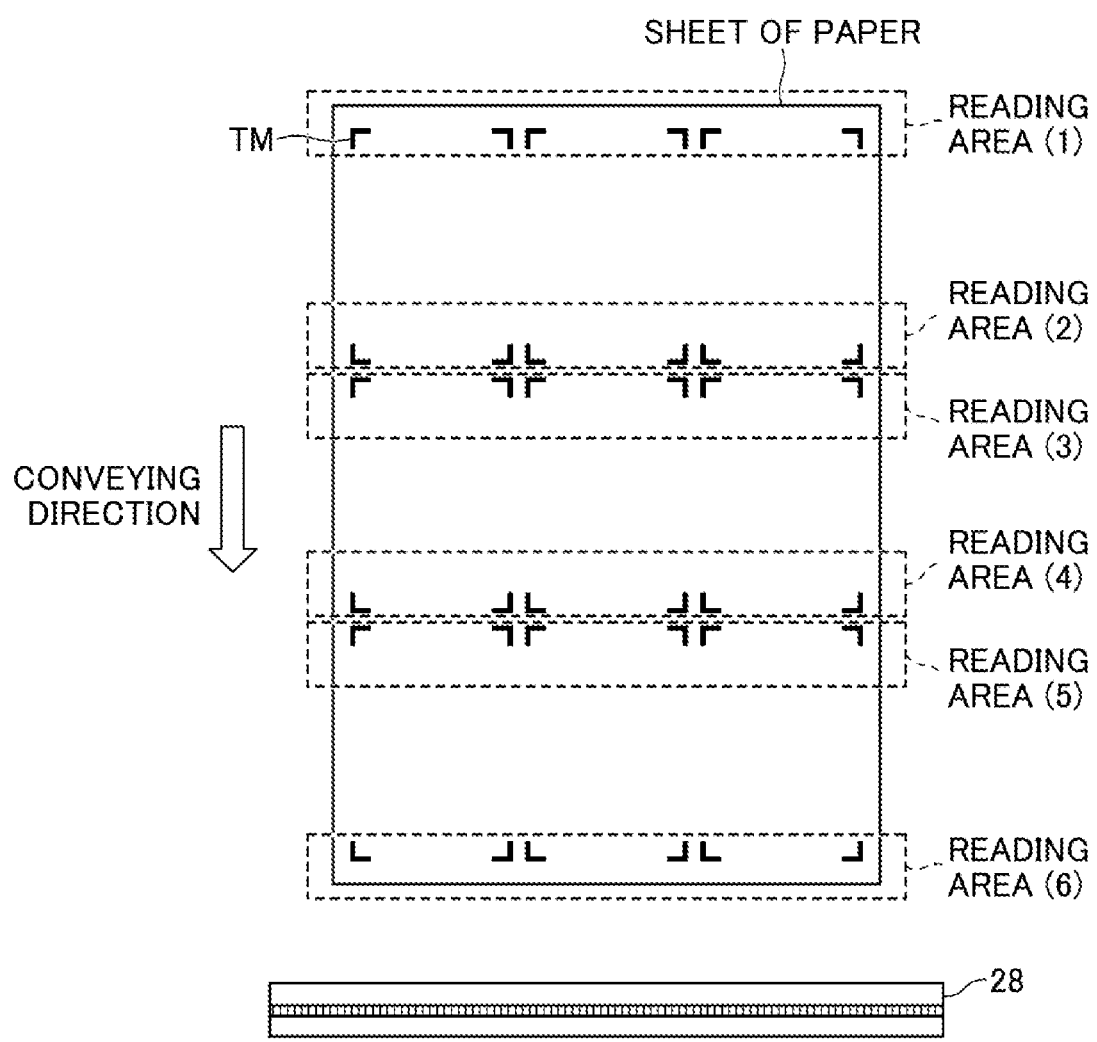
FIG. 9 is a view depicting an example of detecting register marks with respect to an image forming apparatus according to a second embodiment.

FIG. 9 is a diagram depicting an example of detecting a register mark TM in an image forming apparatus according to a second embodiment. For elements similar to the elements of the above-described embodiment, the detailed descriptions will be omitted. The image forming apparatus that implements a detection method for detecting a register mark TM depicted in FIG. 9 has the same configuration and function as the structure and function of the image forming apparatus 100 depicted in FIG. 1, except that the detection method for detecting a register mark TM is partially different. For example, the image forming apparatus according to the present embodiment includes the reading and conveying control mechanism 30 depicted in FIG. 3. The image forming apparatus according to the present embodiment is included in the image forming apparatus system 200 depicted in FIG. 2.

In the present embodiment, the CPU 12 (see FIG. 1) sets a reading area based on layout information indicating a layout of a plurality of pages including print images on one sheet of paper. For example, layout information is preset by the user via the user operating unit 60. The CPU 12 may temporarily store the layout information with respect to pages in the storage unit 14. The CPU 12 estimates positions of register marks TM printed on a front side of a sheet of paper based on the layout information and sets a plurality of reading areas including the estimated positions.

In the example depicted in FIG. 9, as in FIG. 6, a total of nine pages are collectively arranged onto one sheet of paper, three pages (horizontally) by three pages (vertically). In this case, the CPU 12 sets six reading areas (1) through (6) to include the register marks TM arranged along the extending direction of the image sensor 28.

The CPU 12 calculates a conveying timing of a sheet of paper based on sensor information from the paper timing sensor 22 and a conveying speed at which the sheet of paper is to be conveyed. The CPU 12 then provides instructions to the image sensor 28 to cause the image sensor 28 to perform a reading operation at a timing when each of the set reading areas passes exactly under the image sensor 28.

For example, the CPU 12 binarizes image data obtained from the plurality of reading areas to detect only the register marks TM depicted in FIG. 9 and calculate positions of the register marks TM. At this time, the CPU 12 obtains, position information with respect to the sub-scanning direction (=the conveying direction) of each of the reading areas (1) through (6) by converting the number of lines based on the read timing and the counter value of the conveying roller encoder 24. The CPU 12 thus calculates the positions of all the register marks TM present on the sheet of paper.

Thus, by reading the images of the reading areas (1) to (6) including the register marks TM by the image sensor 28, the positions of the register marks TM printed on the front side of the sheet of paper can be detected. Accordingly, the detection process with respect to the register marks TM can be performed at a higher speed than a case where the whole range on a sheet of paper conveyed in the conveying direction is read.

As described above, in the present embodiment, substantially the same advantageous effects as the advantageous effects of the above-described embodiment can be obtained. For example, by printing register marks TM for front and back side registration of a brightness value lower than the minimum brightness value of a print image on a front side of a sheet of paper, the register marks TM can be easily detected, and the positions of the register marks TM can be easily calculated. In addition, by binarizing read image data read from the sheet of paper on which the register marks TM having the brightness value lower than the minimum brightness value of the print images are printed, it is possible to easily distinguish and detect the register marks TM present at intermediate positions of the sheet of paper from the print images.

Further, in the present embodiment, by limiting image reading areas by the image sensor 28 to reading areas in which the register marks TM are present, a detection process with respect to the register marks TM can be performed at a higher speed than a case where the whole range of the sheet of paper conveyed in the conveying direction is read.

Third Embodiment

Figure 10:
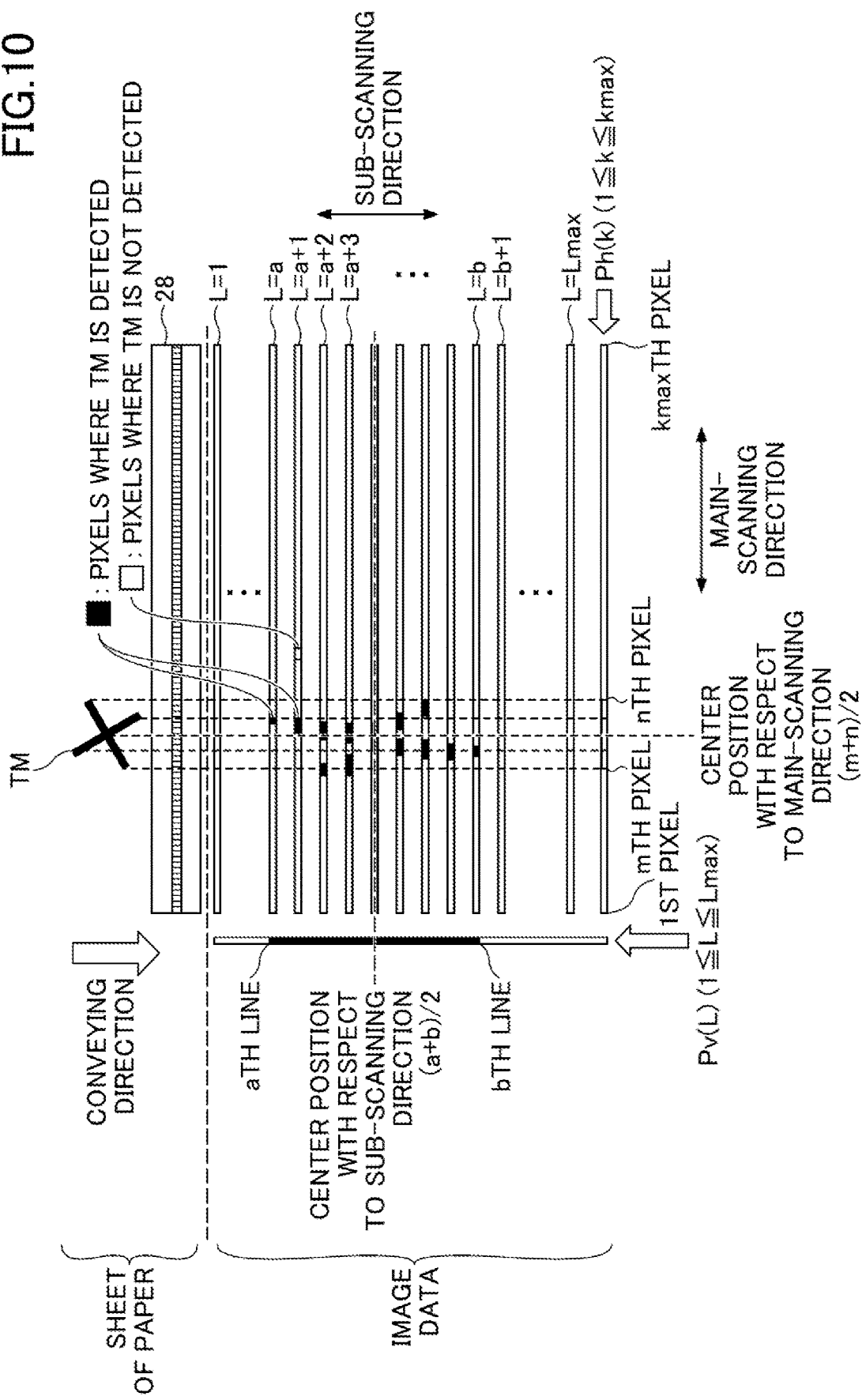
FIG. 10 is a view depicting an example of detecting register marks in an image forming apparatus according to a third embodiment.

FIG. 10 is a diagram depicting an example of detecting a register mark TM in an image forming apparatus according to a third embodiment. For elements similar to the elements of the above-described embodiments, the detailed description will be omitted. The image forming apparatus that implements a detection method for detecting a register mark TM depicted in FIG. 10 has the same structure and function as the structure and function of the image forming apparatus 100 depicted in FIG. 1, except that the detection method for detecting a register mark TM is partially different. For example, the image forming apparatus according to the present embodiment includes the reading and conveying control mechanism 30 depicted in FIG. 3. The image forming apparatus according to the present embodiment is included in the image forming apparatus system 200 depicted in FIG. 2.

In the present embodiment, a cross-shaped register mark TM is used instead of an L-shaped register mark TM used in the above described embodiments. The shape of a register mark TM is not limited to be like a cross, and the shape may be a another point symmetrical shape. By making a register mark TM to have a point symmetrical shape, for example, the center position of the register mark TM can be detected surely even when a sheet of paper is not completely parallel to the conveying direction and the register mark TM is tilted accordingly.

In FIG. 10, a first scan line L at which the image sensor 28 starts a reading operation is set to "1", and a scan line L at which the image sensor 28 ends the reading operation is set to "Lmax". Hereinafter, a scan line L is also referred to as a line L. Further, it is assumed that the number of pixels of the image sensor 28 is kmax and the first pixel on the left side of FIG. 10 is the first pixel. FIG. 10 depicts an example of reading one register mark TM with the image sensor 28 for an explanatory purpose. In image data depicted in FIG. 10, a front end of a sheet of paper in the conveying direction corresponds to line L=1, and the rear end of the sheet in the conveying direction corresponds to line L=Lmax.

Also in FIG. 10, a brightness of the register mark TM is set to be lower than the minimum brightness of the brightness range of a print image. Then, the CPU 12 detects the register mark TM using a binarization threshold in the same manner as depicted in FIG. 5. The image data depicted in FIG. 10 is image data after undergoing a binarization process.

In the binarized image data, a brightness value P(L,k)="0" of a pixel indicates a detection of the register mark TM, and a brightness value P(L,k)="1" of a pixel indicates non-detection of the register mark TM. L denotes a line number and k denotes a pixel number.

Ph(k) indicates whether the register mark TM has been detected, on a per column of pixels basis from among kmax columns of k="1" through "kmax" (pixel number), each column extending along the sub-scanning direction (the vertical direction in FIG. 10). Ph(k) is "0" when a brightness value P of at least one pixel from among the column k of pixels arranged in the sub-scanning direction indicates a detection of the register mark TM. Ph(k) is "1" when brightness values P of all the pixels included in the column k of pixels arranged in the sub-scanning direction indicate that the register mark TM is not detected. Ph(k) is obtained from the brightness values P(L,k) of the pixels included in the column k of pixels using the following Formula (1).

$$Ph(k)=P(1,k) \cdot P(2,k) \ldots \cdot P(L\max,k) \qquad (1)$$

In Formula (1), k is any one of "1" through "kmax". As depicted in Formula (1), Ph(k) indicates a logical conjunction of the brightness values of pixels arranged in the sub-scanning direction.

Pv(L) indicates whether the register mark TM has been detected on a per line of pixels basis from among Lmax lines of L="1" through "Lmax" (line number) arranged in the main-scanning direction (the horizontal direction in FIG. 10). Pv(L) is "0" when a brightness value P of at least one pixel from among the L line of pixels arranged in the main-scanning direction indicates a detection of the register mark TM. Pv(L) is "1" when the brightness values P of all the pixels included in the line L of the pixels arranged in the main-scanning direction indicate that the register mark TM is not detected. Px(L) is obtained from the brightness values P(L,k) of the pixels included in the line L of pixels using the following Formula (2).

$$Pv(L)=P(L,1) \cdot P(L,2) \ldots \cdot P(L,k\max) \qquad (2)$$

In Formula (2), L is any one of "1" through "Lmax". As depicted in Formula (2), Pv(L) indicates a logical conjunction of the brightness values of pixels arranged in the main-scanning direction.

In the example depicted in FIG. 10, the CPU 12 reads all of the images printed on a front side of a sheet of paper by the image sensor 28 and calculates Ph(k) to determine that a register mark TM is included in an mth pixel through an nth pixel with respect to the main-scanning direction. In addition, as a result of calculating Pv(L), the CPU 12 determines that the register mark TM is included in an ath line through a bth line with respect to the sub-scanning direction.

Then, the CPU 12 determines that a center position of the register mark TM with respect to the main-scanning direction is a position corresponding to (m+n)/2, and determines that a center position of the register mark TM with respect to the sub-scanning direction is a position corresponding to (a+b)/2. In addition, the CPU 12 calculates a physical center position of the register mark TM on the sheet of paper using Formula (3) below, where Δk denotes a pixel pitch and ΔL denotes a line cycle interval distance calculated by a line cycle and the paper conveying speed. A line cycle is a reading cycle with respect to one line by the image sensor 28.

$$(Th, Tv) = ((\Delta k \cdot ((m+n)/2) - 1), (\Delta L \cdot ((a+b)/2) - 1)) \quad (3)$$

Th indicates a center position of the register mark TM with respect to the main-scanning direction and indicates a distance from a center position of the first pixel. Tv indicates a center position of the register mark TM with respect to the sub-scanning direction and indicates a distance from a center position of the first line. That is, (Th,Tv) indicates a center coordinate of the register mark TM on the sheet of paper. On the right-hand side of Formula (3), in each of a term to obtain Th and a term to obtain Tv, "1" finally is subtracted to calculate the distance from the first pixel and the distance from the first line, respectively.

As described above, by setting a brightness of a register mark TM having a point symmetrical shape to be lower than the minimum brightness of a print image, and binarizing image data, the CPU 12 can calculate a center position of the register mark TM through a simple logic operation and a simple arithmetic operation.

Figure 11:
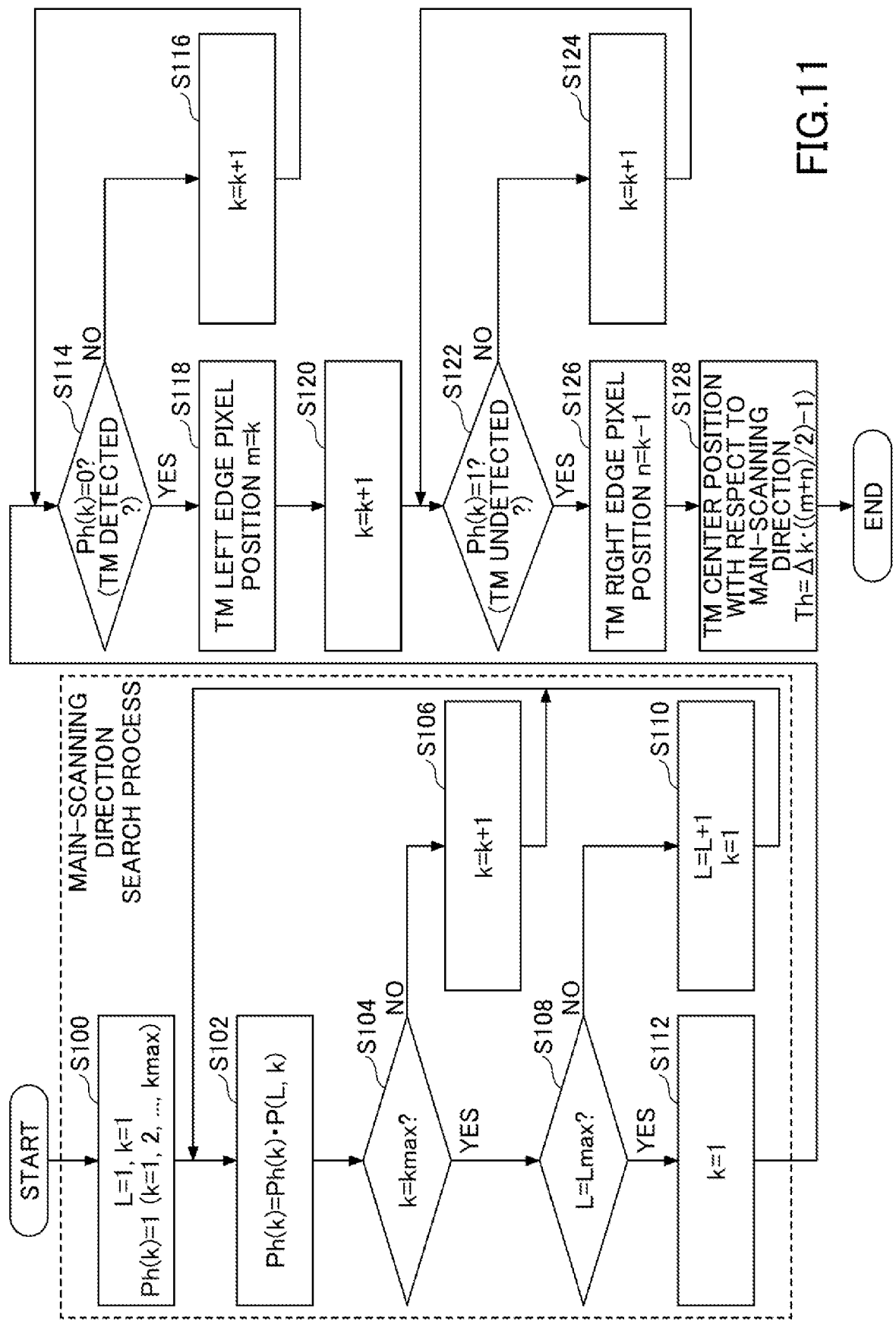
FIG. 11 is a flow diagram depicting an example of detecting a center position of a register mark with respect to a main-scanning direction using a method depicted in FIG. 10.

FIG. 11 is a flow diagram depicting an example of detecting a center position of a register mark TM with respect to the main-scanning direction using the method depicted in FIG. 10. That is, FIG. 11 depicts an example of a control method for controlling the image forming apparatus 100. For example, a process depicted in FIG. 11 is one example of a second process, and is implemented when the CPU 12 executes a control program of the image forming apparatus 100.

First, in step S100, the CPU 12 initializes each of a line number L and a pixel number k to "1", and initializes Ph(k) to "1" for k=1 through kmax. Next, in step S102, the CPU 12 calculates new Ph(k) by multiplying Ph(k), calculated so far, by a brightness value P (L,k) of a currently selected pixel.

Next, in step S104, when the pixel number k is the maximum value kmax, the CPU 12 proceeds to step S108, whereas, when the pixel number k is not the maximum value kmax, the CPU 12 proceeds to step S106. In step S106, the CPU 12 increments the pixel number k by "1" and returns to step S102. Through a loop of steps S102, S104 (NO), and S106, the CPU 12 calculates a logical conjunction Ph(k) of brightness values of the pixels arranged in the main-scanning direction of the selected line L on a per pixel number k basis. That is, the CPU 12 calculates a logical conjunction of the right-hand-side terms of Formula (1) for Ph(k) of k=1 through kmax with respect to a selected line L.

In step S108, when the line number L is the maximum value Lmax, the CPU 12 proceeds to step S112, whereas, when the line number L is not the maximum value Lmax, the CPU 12 proceeds to step S110. In step S110, the CPU 12 increments the line number L by "1", sets the pixel number k to "1", and returns to step S102. In steps S108 (NO) and S110, the CPU 12 updates the line number L in order to execute a loop of steps S102, S104 (NO), and S106 for the next line number L.

In step S112, the CPU 12 sets the pixel number k to "1" and proceeds to step S114. In steps S100-S112, Ph(k) of Formula (1) is calculated for each pixel number k. That is, steps S100-S112 are a main-scanning direction search process for calculating Ph(k) for each column of pixel data arranged in the vertical direction in FIG. 10.

In step S114, the CPU 12 proceeds to step S118 when Ph(k) of the kth column is "0" (register mark TM detected), whereas when Ph(k) of the kth column is "1" (register mark TM undetected), the CPU 12 proceeds to step S116. In step S116, the CPU 12 increments the pixel number k by "1" and returns to step S114.

In step S118, the CPU 12 determines the pixel number k, at which the register mark TM has been detected in step S114, as a pixel position "m" at the left edge of the register mark TM depicted in FIG. 10. Next, in step S120, the CPU 12 increments the pixel number k by "1".

Next, in step S122, the CPU 12 proceeds to step S126 when Ph(k) of the kth column is "1" (register mark TM undetected), whereas when Ph(k) of the kth column is "0" (register mark TM detected) the CPU 12 proceeds to step S124. In step S124, the CPU 12 increments the pixel number k by "1" and returns to step S122.

In step S126, the CPU 12 subtracts "1" from the pixel number k, at which the register mark TM has not been detected in step S122, and determines the pixel position "n" as a right edge of the register mark TM depicted in FIG. 10. Next, in step S128, the CPU 12 calculates a center position Th of the register mark TM with respect to the main-scanning direction depicted in Formula (3) and ends the process of FIG. 11. Here, the CPU 12 calculates the center position Th using the pixel position "m" at the left edge of the register mark TM determined in step S118 and the pixel position "n" at the right edge of the register mark TM determined in step S126.

Figure 12:
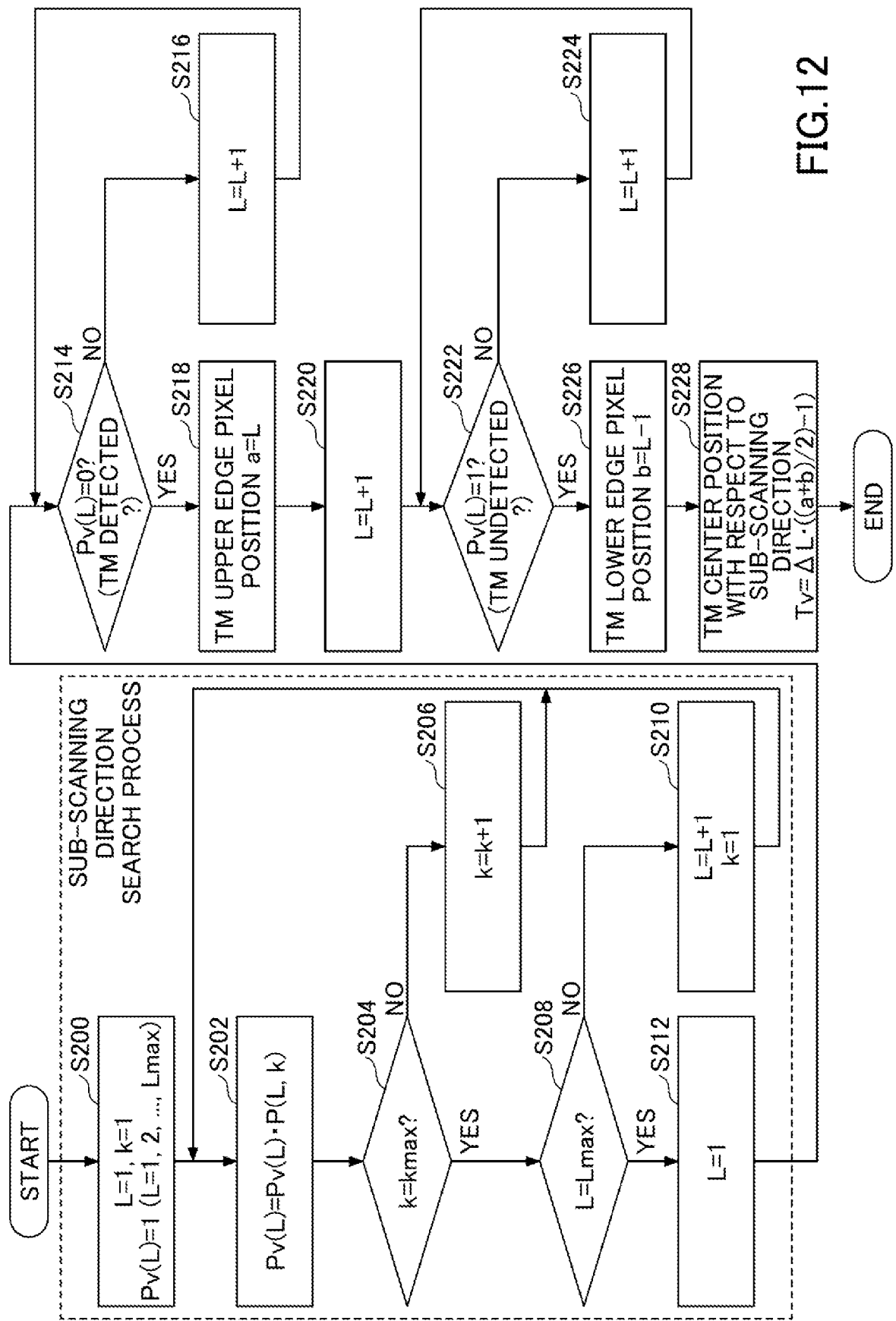
FIG. 12 is a flow diagram depicting an example of detecting a center position of a register mark with respect to a sub-scanning direction using the method depicted in FIG. 10.

FIG. 12 is a flow diagram depicting an example of detecting a center position of a register mark TM with respect to the sub-scanning direction using the method depicted in FIG. 10. That is, FIG. 12 depicts an example of a control method for controlling the image forming apparatus 100. For example, the process depicted in FIG. 12 is an example of a first process, and is implemented when the CPU 12 executes the control program of the image forming apparatus 100.

First, in step S200, the CPU 12 initializes each of a line number L and a pixel number k to "1", and initializes Pv(L) to "1" for L=1 through Lmax. Next, in step S202, the CPU 12 calculates new Pv(L) by multiplying Pv(L) calculated so far by a brightness value P (L,k) of a currently selected pixel.

Next, in step S204, when the pixel number k is the maximum value kmax, the CPU 12 proceeds to step S208, whereas, when the pixel number k is not the maximum value kmax, the CPU 12 proceeds to step S206. In step S206, the CPU 12 increments the pixel number k by "1" and returns to step S202. Through a loop of steps S202, S204 (NO), and S206, the CPU 12 calculates a logical conjunction Pv(L) of brightness values of pixels arranged in the main-scanning direction of a selected one line number L in Formula (2).

In step S208, when the line number L is the maximum value Lmax, the CPU 12 proceeds to step S212, whereas, when the line number L is not the maximum value Lmax, the CPU 12 proceeds to step S210. In step S210, the CPU 12 increments the line number L by "1", sets the pixel number k to "1", and returns to step S202. In steps S208 (NO) and S210, the CPU 12 updates the line number L and executes the loop of steps S202, S204 (NO), and S206 for the updated line number L.

In step S212, the CPU 12 sets the line number L to "1" and executes step S214. In steps S200-S212, Pv(L) of Formula (2) is calculated for each line L. That is, steps S200-S212 are a sub-scanning direction search process for calculating Pv(L) for each line of pixel data arranged in the horizontal direction of FIG. 10.

In step S214, the CPU 12 proceeds to step S218 when Pv(L) of the Lth line is "0" (register mark TM detected), whereas when Pv(L) of the Lth line is "1" (register mark TM undetected) the CPU 12 proceeds to step S216. In step S216, the CPU 12 increments the line number L by "1" and returns to step S214.

In step S218, the CPU 12 determines the line number L at which the register mark TM is detected in step S214 as a line position "a" at the upper edge of the register mark TM depicted in FIG. 10. Then, in step S220, the CPU 12 increments the line number L by "1".

Next, in step S222, the CPU 12 proceeds to step S226 when the Lth line Pv(L) is "1" (register mark TM undetected), whereas when the Lth line Pv(L) is "0" (register mark TM detected) the CPU 12 proceeds to step S224. In step S224, the CPU 12 increments the line number L by "1" and returns to step S222.

In step S226, the CPU 12 subtracts "1" from the line number L at which the register mark TM is not detected in step S222, and sets the thus obtained line number as a line position "b" at the lower edge of the register mark TM depicted in FIG. 10. Next, in step S228, the CPU 12 calculates a center position Tv of the register mark TM with respect to the sub-scanning direction depicted in Formula (3) and ends the process of FIG. 12. Here, the CPU 12 calculates the center position Tv using the line position "a" of the upper edge of the register mark TM determined in step S218 and the line position "b" of the lower edge of the register mark TM determined in step S226.

As described above, in the present embodiment, substantially the same advantageous effects as the advantageous effects of the above-described embodiments can be obtained. For example, by printing a register mark TM for front and back side registration of a brightness value lower than the minimum brightness value of a print image on a front side of a sheet of paper, the register mark TM can be easily detected, and a position of the register mark TM can be easily calculated. In addition, by binarizing read image data read from a sheet of paper on which a register mark TM having a brightness value lower than the minimum brightness value of print images is printed, it is possible to easily distinguish and detect the register mark TM present at an intermediate position of the sheet of paper from the print images.

Further, in the present embodiment, a point symmetrical shape of a register mark TM allows for sure detection of a center position of the register mark TM even when a sheet of paper is not completely parallel to the conveying direction and the register mark TM is tilted. In addition, by respectively calculating logical conjunctions Ph(k) and Pv(L) of brightness values according to Formulas (1) and (2) for each column of pixels in the main-scanning direction and each line of pixels in the sub-scanning direction, a center position of the register mark TM can be calculated by simple logic operations and simple arithmetic operations. At this time, the pixel pitch Δk with respect to the main-scanning direction and the line cycle interval distance ΔL with respect to the sub-scanning direction can be used to calculate a physical position of the register mark TM on the sheet of paper according to Formula (3).

Fourth Embodiment

Figure 13:
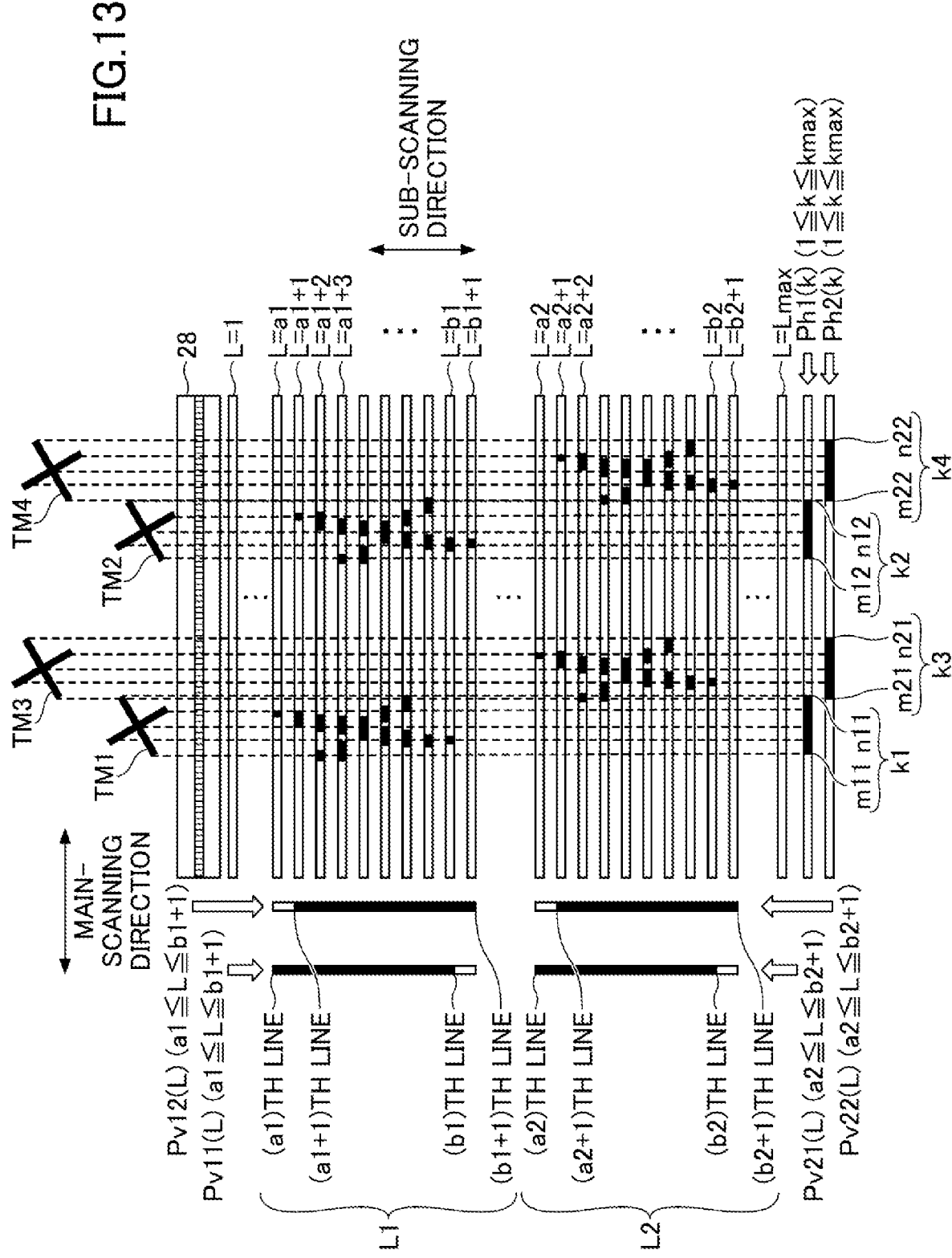
FIG. 13 is a diagram depicting an example of detecting a register mark in an image forming apparatus according to a fourth embodiment.

FIG. 13 is a diagram depicting an example of detecting a register mark TM in an image forming apparatus according to a fourth embodiment. For elements similar to the elements of the above-described embodiments, the detailed description will be omitted. The image forming apparatus that implements a detection method for detecting a register mark TM depicted in FIG. 13 has the same structure and function as the structure and function of the structure and function of the image forming apparatus 100 depicted in FIG. 1, except that the detection method for detecting a register mark TM is partially different. For example, the image forming apparatus according to the present embodiment includes the reading and conveying control mechanism 30 depicted in FIG. 3. The image forming apparatus according to the present embodiment is included in the image forming apparatus system 200 depicted in FIG. 2.

In the present embodiment, similar to the third embodiment, a point symmetrical shape, such as a cross, is used as a shape of register mark TM having a brightness less than the minimum brightness of a print image. Similar to the third embodiment, the CPU 12 detects a center position of the register mark TM using image data obtained from binarization of the image data read by the image sensor 28. A binarization process of image data provided by the image sensor 28 may be performed concurrently with reading by the image sensor 28.

With regard to the present embodiment, an example of a detection method when a plurality of register marks TM1, TM2, TM3, and TM4 are arranged along the main and sub-scanning directions of a sheet of paper will be described. In a case where a plurality of register marks TM are arranged along the main-scanning direction and the sub-scanning direction of a sheet of paper, the CPU 12 divides an area of the sheet of paper into a plurality of groups (i.e., line groups or column groups of pixels), estimates a position of a register mark TM on a per group basis, and detects the position of each register mark TM based on the estimated results.

For example, the CPU 12 first performs a sub-scanning direction search process depicted in FIG. 12 and calculates Pv(L) indicating whether a register mark TM is detected for each of lines having the line number L=1 through Lmax. Then, the CPU 12 detects a group of line numbers L (a line group) where Pv(L)="0" indicating a detection of the register mark TM successively occurs.

In the example depicted in FIG. 13, CPU 12 detects a line group L1 including lines "a1" through "b1+1" and a line group L2 including lines "a2" through "b2+1". At this time point, it is unclear whether each of the register marks TM1 through TM4 belongs to the line group L1 or the line group L2.

For example, in one case, as depicted in FIG. 6, a total of nine pages, three pages (horizontally arranged) by three page (vertically arranged), are collectively arranged on one sheet of paper, and cross-shaped register marks TM are printed around a print image of each of these nine pages. In this case, because the register marks TM are arranged at six places that are arranged along the sub-scanning direction in the same manner as the reading areas (1) through (6) depicted in FIG. 9, the CPU 12 detects six line groups corresponding to the reading areas (1) through (6).

Returning to FIG. 13, next, the CPU 12 performs a main-scanning direction search process depicted in FIG. 11 for each of the line groups L1 and L2, and calculates Ph(k) indicating whether a register mark TM is detected for each of pixel numbers k=1 through kmax. At this time, with respect to the line group L1, the CPU 12 sets an initial value of line L to "a1" and sets Lmax to "b1+1". With respect to the line group L2, the CPU 12 sets an initial value of line L to "a2" and sets Lmax to "b2+1". The CPU 12 detects a group (column group) of pixel numbers k where Ph(k)="0" indicating a detection of a register mark TM successively occurs.

In the example depicted in FIG. 13, the CPU 12 detects a column group k1 including pixels m11 through n11 and a column group k2 including pixels m12 through n12 with respect to the line group L1. The CPU 12 detects a column group k3 including pixels m21 through n21 and a column group k4 including pixels m22 through n22 with respect to the line group L2. The CPU 12 thus detects that each of the line groups L1 and L2 includes two register marks TM. That is, the CPU 12 detects the presence of the total four register marks TM.

The CPU 12 calculates a center position of each of the register marks TM with respect to the main-scanning direction using ($\Delta k$ ((m+n)/2)−1) of Formula (3) for each set of the pixels m11 through n11, the pixels m12 through n12, the pixels m21 through n21, and the pixels m22 through n22.

Next, the CPU 12 performs a process of detecting a center position of a register marks TM with respect to the sub-scanning direction depicted in FIG. 12 for a range of the lines "a1" through "b1+1" and the pixels "m11" through "n11", the range being a range where the line groups L1 and the column group k1 overlap. At this time, the CPU 12 sets an initial value of line L to "a1", sets the Lmax to "b1+1", sets an initial value of pixel k to "m11", and sets the kmax to "n11."

Similarly, the CPU 12 performs a process of detecting a center position of a register mark TM with respect to the sub-scanning direction depicted in FIG. 12 for a range of the lines "a1" through "b1+1" and the pixels "m12" through "n12", the range being a range where the line group L1 and the column group k2 overlap. At this time, the CPU 12 sets an initial value of line L to "a1", sets the Lmax to "b1+1", sets an initial value of pixel k to "m12", and sets the kmax to "n12."

Further, the CPU 12 performs a process of detecting a center position of a register mark TM with respect to the sub-scanning direction depicted in FIG. 12 for a range of the lines "a2" through "b2+1" and the pixels "m21" through "n21", the range being a range where the line group L2 and the column group k1 overlap. At this time, the CPU 12 sets an initial value of line L to "a2", sets the Lmax to "b2+1", sets an initial value of pixel k to "m21", and sets the kmax to "n21."

The CPU 12 performs a process of detecting a center position of a register mark TM with respect to the sub-scanning direction depicted in FIG. 12 for a range of the lines "a2" through "b2+1" and the pixels "m22" through "n22", the range being a range where the line group L2 and the column group k2 overlap. At this time, the CPU 12 sets an initial value of line L to "a2", sets the Lmax to "b2+1", sets an initial value of pixel k to "m22", and sets the kmax to "n22."

Thus, the CPU 12 performs processes depicted in FIGS. 11 and 12, limiting the line and pixel ranges. The CPU 12 detects the center position of the register mark TM1 in an area where the line group L1 and the column group k1 intersect, and detects the center position of the register mark TM2 in an area where the line group L1 and the column group k2 intersect. The CPU 12 detects the center position of the register mark TM3 in an area where the line group L2 and the column group k1 intersect, and detects the center position of the register mark TM4 in an area where the line group L2 and the column group k2 intersect.

As described above, in the present embodiment, substantially the same advantageous effects as the advantageous effects of the above-described embodiments can be obtained. For example, by printing a register mark TM for front and back side registration of a brightness value lower than the minimum brightness value of a print image on a front side of a sheet of paper, the register mark TM can be easily detected, and the position of the register mark TM can be easily calculated. In addition, by binarizing read image data read from a sheet of paper on which a register mark TM having a brightness value lower than the minimum brightness value of print images is printed, it is possible to easily distinguish and detect the register mark TM present at an intermediate position of the sheet of paper from the print images. In addition, by using a register mark TM having a point symmetrical shape, even when a sheet of paper skew or a misalignment of a sheet of paper occurs during reading of an image from a front side of the sheet of paper, the center position of the register mark TM can be surely detected.

Further, in the present embodiment, even when a plurality of register marks TM are printed on a front side of a sheet of paper, the center position of each of the plurality of register marks TM can be easily and surely calculated. In this case, the CPU 12 does not need to use layout information indicating a layout of a plurality of pages respectively including print images. Accordingly, the center position of each of the plurality of register marks TM can be calculated without setting reading areas such as the setting areas depicted in FIG. 9.

Although the image forming apparatuses and the methods for controlling image forming apparatus have been described with reference to the embodiments, the present invention is not limited to the embodiments, and various variations and modifications can be made within the scope of the present invention.

Thus, although the present invention has been described with reference to the embodiments, the present invention is not limited to the requirements with respect to the embodiments. In these respects, the subject matter of the present invention may be varied without departing from the concept of the present invention and may be suitably defined according to its particular application.

What is claimed is:

1. An image forming apparatus comprising:
one or more processors and one or more memories storing program instructions, which, when being executed by the one or more processors, cause the one or more processors to:
generate a print image to be printed on a sheet of paper and a position correcting mark for front and back side registration disposed outside of the print image, wherein a brightness range of the print image is bound by a preset minimum brightness, and a brightness of the position correcting mark is set to be less than the preset minimum brightness;
control printing of the print image and the position correcting mark on a first side of the sheet of paper;
control reading the print image and the position correcting mark from the first side and control generating of read image data; and detect, from the read image data, the position correcting mark on the first side based on a brightness difference indicating a transition from the print image to the position correcting mark.

2. The image forming apparatus according to claim 1, wherein
the program instructions, which, when being executed by the one or more processors, further cause the one or more processors to:
binarize the read image data using a binarization threshold set between the preset minimum brightness of the print image and the brightness of the position correcting mark, and detect the position correcting mark from the read image data as binarized.

3. The image forming apparatus according to claim 2, wherein
the program instructions, which, when being executed by the one or more processors, further cause the one or more processors to:
generate read line image data sequentially on a per line-of-pixels basis, a line of pixels being arranged along a second direction that is perpendicular to a first direction along which the sheet of paper is conveyed, and
binarize the read line image data each time when generating the read line image data to detect the position correcting mark.

4. The image forming apparatus according to claim 1, wherein
the program instructions, which, when being executed by the one or more processors, further cause the one or more processors to:
detect lines including the position correcting mark from a plurality of lines included in the read image data and arranged along a direction along which the sheet of paper is conveyed,
detect columns including the position correcting mark from a plurality of columns included in the read image data and arranged along a direction perpendicular to the direction along which the sheet of paper is conveyed, and
detect the position correcting mark based on the lines and the columns detected by the one or more processors.

5. The image forming apparatus according to claim 4, further comprising:
a reader configured to read the print image under the control of the one or more processors; and
a conveyer configured to convey the sheet of paper to the reader, wherein
the program instructions, which, when being executed by the one or more processors, further cause the one or more processors to:
calculate a position of the position correcting mark on the sheet of paper with respect to the direction along which the sheet of paper is conveyed, using a reading cycle of the reader to read each line and a conveying speed of the conveyer to convey the sheet of paper, the position correcting mark having been detected by the one or more processors based on the lines and the columns detected by the one or more processors.

6. The image forming apparatus according to claim 1, wherein
the program instructions, which, when being executed by the one or more processors, further cause the one or more processors to:
estimate a position of the position correcting mark on the first side, based on layout information indicating a layout of the print image on the first side, and detect the position correcting mark from an area including the position estimated by the one or more processors.

7. The image forming apparatus according to claim 1, wherein
the position correcting mark has a point symmetrical shape.

8. The image forming apparatus according to claim 1, wherein
the program instructions, which, when being executed by the one or more processors, further cause the one or more processors to:
generate a print image and the position correcting mark for each of a plurality of pages to be printed on the first side, and
detect the position correcting mark printed on the first side for each of the plurality of pages printed.

9. The image forming apparatus according to claim 1, wherein
the program instructions, which, when being executed by the one or more processors, further cause the one or more processors to:
perform at least adjusting a position of, changing a size increase rate of, rotation of, or changing a shape of a print image of any one of a plurality of pages printed on a second side opposite to the first side, based on the position correcting mark that is printed for each of a plurality of pages printed on the first side and is detected by the one or more processors.

10. A method for controlling an image forming apparatus that includes one or more processors and one or more memories storing program instructions, the method being implemented by the one or more processors when the program instructions are executed by the one or more processors, the method comprising:
generating a print image to be printed on a sheet of paper and a position correcting mark for front and back side registration disposed outside of the print image, wherein a brightness range of the print image is bound by a preset minimum brightness, and a brightness of the position correcting mark is set to be less than the preset minimum brightness;
controlling printing of the print image and the position correcting mark on a first side of the sheet of paper;
controlling reading of the print image and the position correcting mark from the first side and controlling generating of read image data; and
detecting from the read image data the position correcting mark on the first side based on a brightness difference indicating a transition from the print image to the position correcting mark.

11. The method according to claim 10, further comprising:
binarizing the read image data using a binarization threshold set between the preset minimum brightness of the print image and the brightness of the position correcting mark,
wherein detecting the position correcting mark comprises detecting the position correcting mark from the read image data as binarized.

* * * * *